United States Patent
Samborn et al.

(10) Patent No.: US 9,862,121 B2
(45) Date of Patent: Jan. 9, 2018

(54) KNEADING METHOD AND APPARATUS

(71) Applicant: B&P Process Equipment and Systems LLC, Saginaw, MI (US)

(72) Inventors: Scott Lee Samborn, Freeland, MI (US); Douglas J Marsh, Bay City, MI (US); John E. Kress, Hemlock, MI (US); Gonzalo Marulanda-Paz, Saginaw, MI (US)

(73) Assignee: B&P Littleford LLC, Saginaw, MI (US)

( * ) Notice: Subject to any disclaimer, the term of this patent is extended or adjusted under 35 U.S.C. 154(b) by 259 days.

(21) Appl. No.: 14/653,247

(22) PCT Filed: Dec. 14, 2013

(86) PCT No.: PCT/US2013/075197
§ 371 (c)(1),
(2) Date: Jun. 17, 2015

(87) PCT Pub. No.: WO2014/099683
PCT Pub. Date: Jun. 26, 2014

(65) Prior Publication Data
US 2015/0367531 A1    Dec. 24, 2015

Related U.S. Application Data

(60) Provisional application No. 61/738,113, filed on Dec. 17, 2012.

(51) Int. Cl.
*B29B 7/36* (2006.01)
*B29B 7/42* (2006.01)
(Continued)

(52) U.S. Cl.
CPC ................ *B29B 7/42* (2013.01); *A21C 1/065* (2013.01); *B01F 11/0057* (2013.01);
(Continued)

(58) Field of Classification Search
CPC ..... B29C 47/44; B29C 47/0801; A21C 1/065; B29B 7/42; B29B 7/423; B29B 7/58;
(Continued)

(56) References Cited

U.S. PATENT DOCUMENTS 2,411,971 A * 12/1946 MacMillin .............. B29C 47/92
100/145
2,505,125 A * 4/1950 List .......................... B29B 7/423
100/145
(Continued)

FOREIGN PATENT DOCUMENTS

CN          202161960 U       3/2012
JP          2005131578        5/2005
(Continued)

OTHER PUBLICATIONS

Chang, Bong Ho; PCT Written Opinion of the International Searching Authority; PCT/US2013/045447; Korean Intellectual Property Office; Apr. 15, 2014.
(Continued)

*Primary Examiner* — Tony G Soohoo
(74) *Attorney, Agent, or Firm* — John B. Hardaway, III; Nexsen Pruet, LLC

(57) ABSTRACT

A method and apparatus for a reciprocating kneader. A primary rotational gear is attached to a gear box primary shaft and rotates in concert therewith and engages a secondary rotational gear. The primary rotational gear drive provides a primary source of rotation for a kneading screw and for the secondary gear as a secondary source of rotation. An adjustable eccentric is coupled to the secondary oscillation gear and rotates in concert therewith for reciprocation motion.

2 Claims, 9 Drawing Sheets

(51) Int. Cl.
- B29B 7/58 (2006.01)
- B29C 47/44 (2006.01)
- B29C 47/08 (2006.01)
- B01F 11/00 (2006.01)
- A21C 1/06 (2006.01)
- F26B 11/20 (2006.01)
- B01F 15/00 (2006.01)

(52) U.S. Cl.
CPC .. B01F 15/00435 (2013.01); B01F 15/00467 (2013.01); B29B 7/36 (2013.01); B29B 7/423 (2013.01); B29B 7/58 (2013.01); B29C 47/44 (2013.01); F26B 11/20 (2013.01); B29C 47/0801 (2013.01)

(58) Field of Classification Search
CPC ............... B29B 7/36; B01F 15/00467; B01F 15/00435; B01F 11/0057; F26B 11/20
See application file for complete search history.

(56) References Cited

U.S. PATENT DOCUMENTS

| | | | | |
|---|---|---|---|---|
| 2,547,151 | A | 4/1951 | Braeseke | |
| 2,629,132 | A | 2/1953 | Willox | |
| 2,916,769 | A | 12/1959 | Baigent | |
| 3,115,681 | A | 12/1963 | Hendry | |
| 3,133,316 | A | 5/1964 | Arpajian | |
| 3,163,693 | A * | 12/1964 | Stenger | B29C 45/50 264/328.17 |
| 3,219,320 | A * | 11/1965 | Sutter | B29B 7/423 366/289 |
| 3,224,739 | A * | 12/1965 | Schuur | B01F 11/0057 366/321 |
| 3,253,818 | A * | 5/1966 | Seddon | B01J 19/20 366/142 |
| 3,281,899 | A | 11/1966 | Dacco | |
| 3,285,163 | A | 11/1966 | Burner | |
| 3,301,138 | A * | 1/1967 | Cox | B01F 11/0057 366/149 |
| 3,317,962 | A | 5/1967 | Morse | |
| 3,335,457 | A * | 8/1967 | Martin, Jr. | B29C 45/50 264/541 |
| 3,380,116 | A * | 4/1968 | Loomans | B01F 11/0057 366/100 |
| 3,427,639 | A * | 2/1969 | Strauss | B29C 45/50 264/328.2 |
| 3,436,443 | A * | 4/1969 | Hutchinson | B29C 45/50 264/328.19 |
| 3,443,446 | A | 5/1969 | Buergel | |
| 3,456,298 | A | 7/1969 | Foster | |
| 3,458,894 | A | 8/1969 | Wheeler | |
| 3,570,588 | A | 3/1971 | Wheeler | |
| 3,618,903 | A * | 11/1971 | Ronner | B01F 7/02 15/246.5 |
| 3,637,069 | A * | 1/1972 | Christian | B01F 7/00391 198/676 |
| 3,728,053 | A | 4/1973 | Stillhard | |
| 3,734,635 | A * | 5/1973 | Blach | B29B 7/488 366/85 |
| 3,734,667 | A | 5/1973 | Day | |
| 3,776,529 | A * | 12/1973 | Sutter | 1/57 |
| 3,788,609 | A | 1/1974 | Toczyski | |
| 3,855,869 | A | 12/1974 | Dimitrov | |
| 3,862,551 | A * | 1/1975 | Loomans | B01F 11/0054 403/59 |
| 3,908,968 | A | 9/1975 | Bielfeldt | |
| 4,004,788 | A | 1/1977 | Ronner | |
| 4,223,600 | A | 9/1980 | Adarraga | |
| 4,538,917 | A | 9/1985 | Harms | |
| 5,089,178 | A | 2/1992 | Passoni | |
| 5,178,461 | A * | 1/1993 | Taniguchi | B01F 11/0057 366/307 |
| 5,391,000 | A | 2/1995 | Taniguchi | |
| 6,431,755 | B1 * | 8/2002 | Schneider | B29C 47/0801 366/100 |
| 8,807,825 | B2 * | 8/2014 | Samborn | B01F 7/082 366/100 |
| 9,566,719 | B2 * | 2/2017 | Samborn | B01F 7/082 |
| 2007/0140054 | A1 | 6/2007 | Stocker | |
| 2007/0171767 | A1 | 7/2007 | Huang | |
| 2007/0183253 | A1 | 8/2007 | Siegenthaler | |
| 2008/0067719 | A1 * | 3/2008 | Schlummer | B01F 5/045 264/328.1 |
| 2009/0040867 | A1 * | 2/2009 | Schulz | B30B 11/243 366/301 |
| 2012/0039145 | A1 * | 2/2012 | Samborn | B01F 7/082 366/78 |
| 2014/0102232 | A1 * | 4/2014 | Samborn | B01F 7/082 74/22 R |
| 2015/0124551 | A1 * | 5/2015 | Samborn | B01F 7/082 366/78 |

FOREIGN PATENT DOCUMENTS

| | | |
|---|---|---|
| JP | 2008190677 | 8/2008 |
| KR | 10-2008-0039882 A | 5/2008 |

OTHER PUBLICATIONS

Truchot, Alexandre; Extended European Search Report; European Patent Office; EP 11818670.9; dated Jun. 16, 2015.
Truchot, Alexander; Extended European Search Report; European Patent Office; EP 11818670.9; dated Jun. 16, 2015.
Lee, Dong Wook, International Search Report, dated Apr. 14, 2014, PCT/US2013/075197, ISA/KR.
Lee, Dong Wook, Written Opinion, dated Apr. 14, 2014, PCT/US2013/075197, ISA/KR.

* cited by examiner

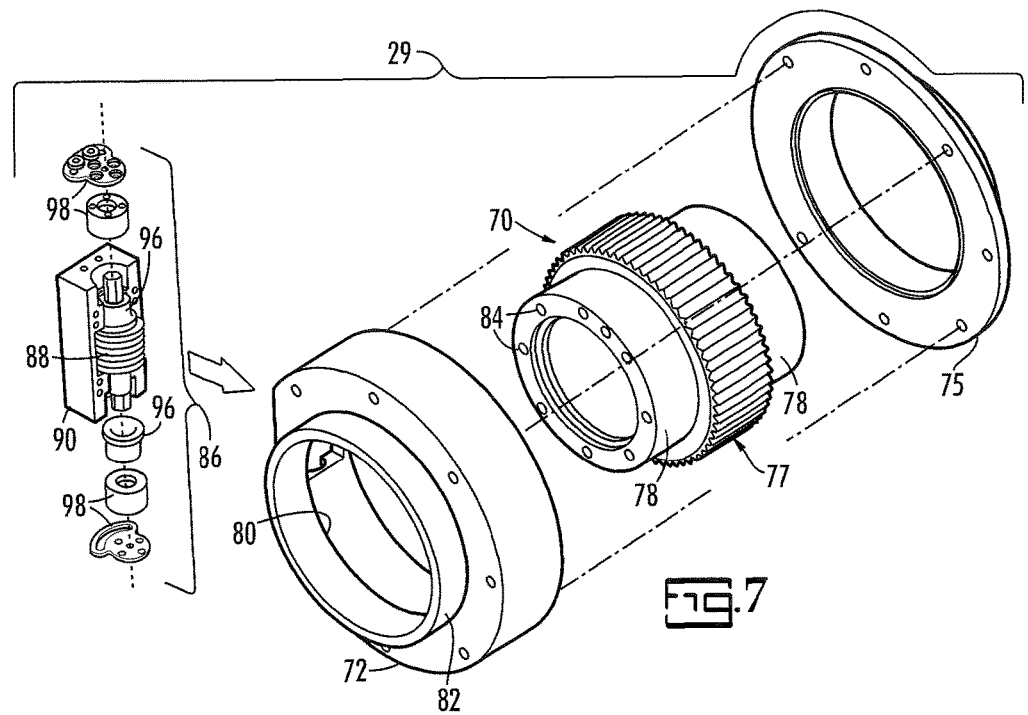
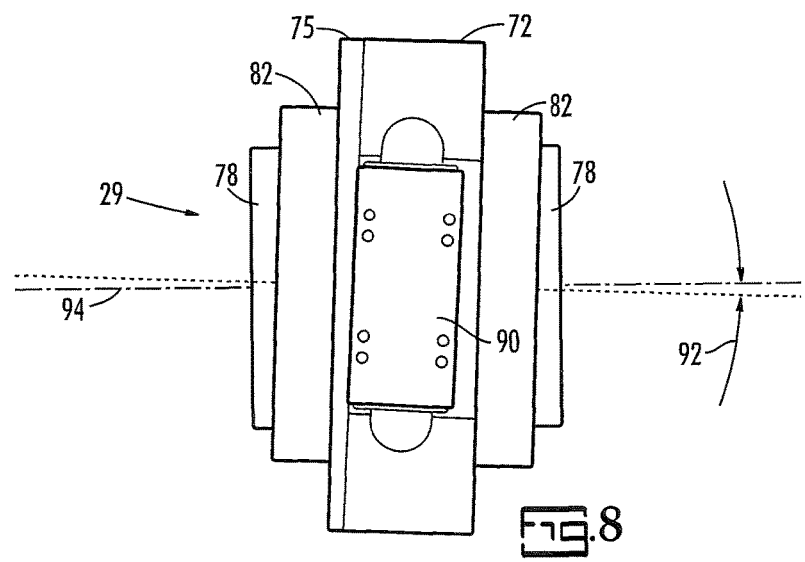

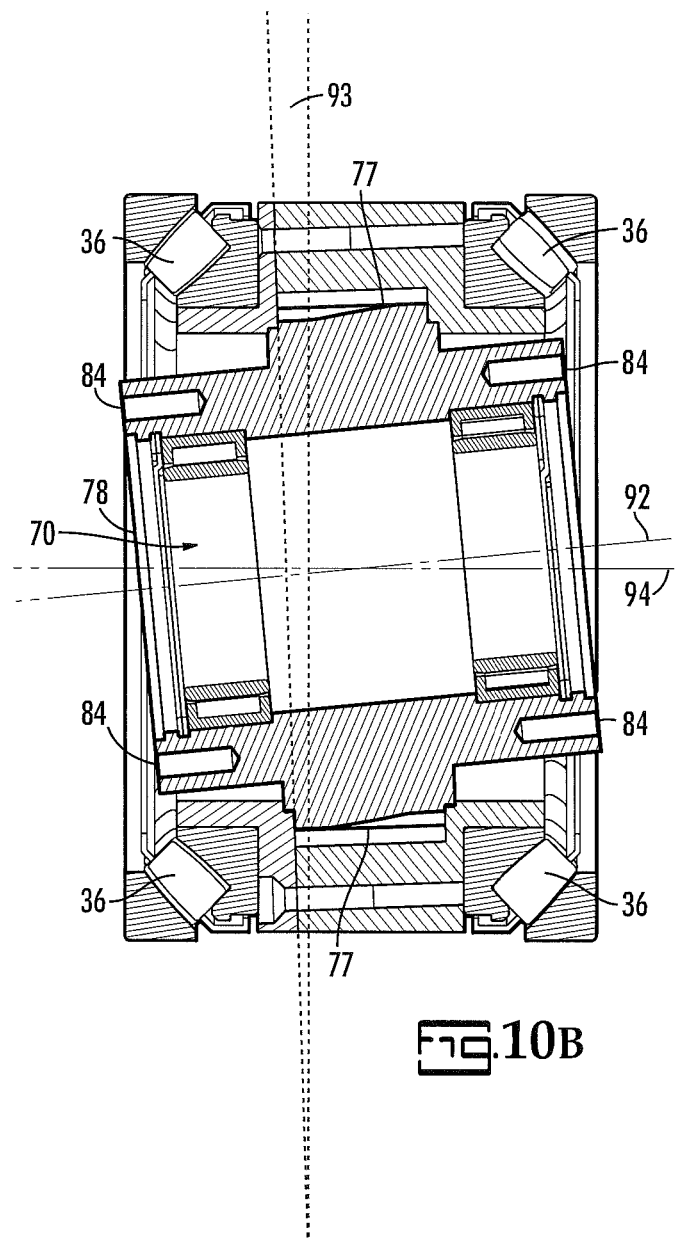

KNEADING METHOD AND APPARATUS

BACKGROUND

The present invention is related to a gear box for a kneading machine which allows coupled oscillation and rotation from a single drive wherein the oscillation strokes per revolution is adjustable but invariant at a given adjustment. More specifically, the present invention is related to an adjustable eccentric which allows for fine tuning of the oscillation amplitude or stroke length.

Kneading machines are widely used in a variety of applications. In general, kneading machines can be categorized as either rotational only or rotational and oscillatory. The present application is related to a kneader capable of rotating and oscillating which is also referred to in the art as a reciprocating kneader.

A critical design feature of a reciprocating kneader is the relationship between the rotation and the oscillation. For convenience in the art this is referred to as "stroke ratio" which is the number of oscillations, or translations parallel to the rotational axis, per rotation of the axis. For example, a stroke ratio of 1 would indicate that the oscillation starts at an initial point, moves through the entire range of motion and returns to the starting point during a single rotation. The range of motion is referred to as "stroke length". With a stroke ratio of 2 the oscillation would occur twice with a single rotation. The stroke ratio can be a whole number or in some instances it may be a fraction, such as 2.5, wherein five oscillations would occur with two rotations.

The screw design and, if present, pin arrangement, define the stroke ratio and stroke length requirements of a reciprocating kneader. If the stroke ratio and stroke length is not matched to the screw design and pin arrangement the screw flights and pins may collide in catastrophic fashion. As a result, reciprocating kneaders have been considered relatively inflexible with regards to design changes. Reciprocating kneaders are typically designed for a specific application and the design choice often limits the materials which can be kneaded in an existing kneader.

As would be realized the rotation and oscillation can be adjusted by using separate drive mechanisms yet this approach has a high failure rate. If one drive mechanism varies, even slightly, the rotation and oscillation lose their synchronous motion which leads to collisions of flights and pins with catastrophic results. Therefore, it is highly desirable that the rotation and oscillation have a common drive to avoid the potential for stroke ratio variability.

It has been a long standing desire to provide a reciprocating kneader wherein the stroke ratio can be easily modified thereby allowing for variations in the combination of screw and pin. This would allow a single unit to be used for many different applications simply by inserting a different screw, using a different pin arrangement and adjusting the stroke ratio and stroke length in accordance with the choice of screw and pin. Unfortunately, such equipment has been limited by the lack of a suitable gearbox.

U.S. patent Ser. No. 12/857,001 filed Aug. 16, 2010, which is incorporated herein by reference, provides a gear box wherein the stroke ratio is constant regardless of the rotation rate of the reciprocating kneader. Even though this represents an advance in the art the stroke length is not easily adjusted to account for manufacturing tolerances which has thwarted full implementation of the gear box.

SUMMARY

It is an object of the present invention to provide a reciprocating kneader which allows for fine tuning of the stroke length.

It is another object of the present invention to provide a gear box which is particularly suitable for use with a reciprocating kneader wherein the stroke ratio in addition to stroke length can be easily adjusted thereby allowing for flexibility in screw and pin combinations.

A particular feature of the present invention is the ability to utilize a single drive thereby insuring that the stroke ratio is invariant with regards to rotation rate.

These and other features, as will be realized, are provided in a gear box for a reciprocating kneader. The gear box has a casing and a gear box primary shaft adapted for coupling to a motor. A primary rotational gear is attached to the gear box primary shaft which rotates in concert with the gear box primary shaft. A secondary rotational gear is engaged with the primary rotation gear which rotates in concert with the primary rotational gear. A gear box secondary shaft is attached to the secondary rotational gear which rotates in concert with the secondary rotational gear. A primary oscillation gear is attached to the gear box primary shaft which rotates in concert with the gear box primary shaft. A secondary oscillation gear is engaged with the primary oscillation gear which rotates in concert with the primary oscillation gear wherein the secondary oscillation gear rotates on the gear box secondary shaft. An adjustable eccentric is coupled to the secondary oscillation gear wherein the adjustable eccentric rotates in concert with the secondary oscillation gear. A yoke is engaged with the adjustable eccentric wherein the yoke oscillates on an axis perpendicular to the gear box secondary shaft in response to rotation of the adjustable eccentric and the gearbox secondary shaft moves along a gear box secondary shaft axis in concert with yoke oscillation. A housing is pivotally attached to the yoke at a yoke pivot axis and pivotally attached to the casing at a casing pivot axis herein the yoke pivot axis and the casing pivot axis are not parallel. A coupling is on the gear box secondary shaft and adapted for attachment to the kneader.

Yet another embodiment of the invention is provided in a reciprocating kneader. The reciprocating kneader has a kneader with a cylindrical casing and a screw extending into the cylindrical casing wherein the screw comprises flights and pins extending into the cylindrical casing. The reciprocating kneader also has a gear box with a casing and a gear box primary shaft adapted for coupling to a motor. A primary rotational gear is attached to the gear box primary shaft which rotates in concert with the gear box primary shaft. A secondary rotational gear is engaged with the primary rotation gear which rotates in concert with the primary rotational gear. A gear box secondary shaft is attached to the secondary rotational gear which rotates in concert with the secondary rotational gear. A primary oscillation gear is attached to the gear box primary shaft which rotates in concert with the gear box primary shaft. A secondary oscillation gear is engaged with the primary oscillation gear which rotates in concert with the primary oscillation gear wherein the secondary oscillation gear rotates on the gear box secondary shaft. An adjustable eccentric is coupled to the secondary oscillation gear wherein the adjustable eccentric rotates in concert with the secondary oscillation gear. A yoke is engaged with the adjustable eccentric wherein the yoke oscillates on an axis perpendicular to the gear box secondary shaft in response to contact with the adjustable eccentric during rotation and the gearbox secondary shaft moves along its axis in concert with yoke oscillation. A housing is pivotally attached to the yoke at a yoke pivot axis and pivotally attached to the casing at a casing pivot axis herein the yoke pivot axis and the casing pivot axis are not parallel. The gear box secondary shaft is coupled to the screw such that movement of the screw moves in concert with movement of the gear box secondary shaft. A motor is coupled to the gear box primary shaft.

BRIEF DESCRIPTION OF THE FIGURES

FIG. 7 is an exploded schematic view of an adjustable stroke eccentric of the invention.

FIG. 8 is a side schematic view of an embodiment of the invention.

FIGS. 10A and 10B illustrate an embodiment of the invention.

DETAILED DESCRIPTION

The present invention is directed to a reciprocating kneader and, particularly, a reciprocating kneader wherein the stroke length can be refined after assembly to accommodate various screw/pin combinations with minimal effort. More particularly, the present invention is directed to a gear box which is particularly suitable for use with a reciprocating kneader.

The present invention will be described with reference to the figures which are an integral, but non-limiting, part of the instant specification. Throughout the description similar elements will be numbered accordingly.

Figure 1:
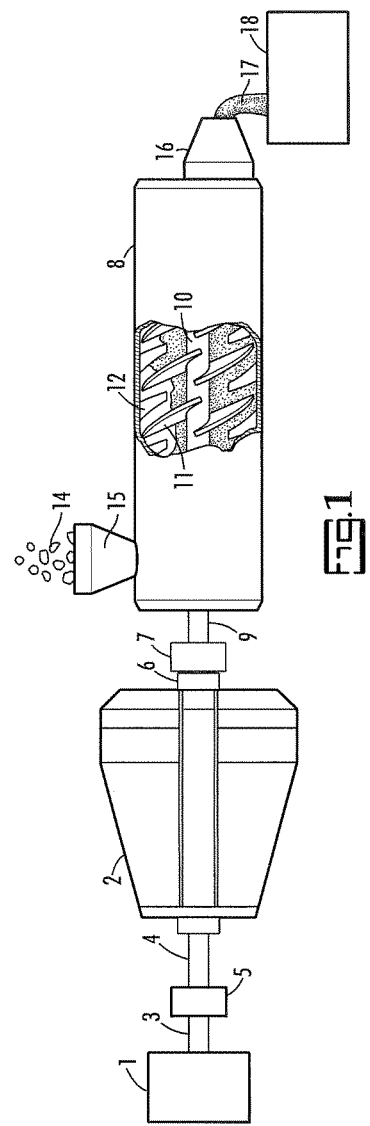
FIG. 1 is a schematic partial cut-away view of an embodiment of the invention.

An embodiment of the invention is illustrated in schematic partial cut-away view in FIG. 1. In FIG. 1, a drive motor, 1, having a motor drive shaft, 3, is the primary source of power for the gear box, 2. The motor drive shaft is coupled to a gear box primary shaft, 4, by a primary shaft couple, 5. The motor, which is not limited herein, may be directly coupled, as illustrated, or coupled through a mechanism such as a transmission, gear assembly, belt assembly or the like without limit thereto. For the purposes of the present invention the drive motor is arranged to rotate the gear box primary shaft.

The gear box, 2, which will be described more fully herein, has an output coupler, 6, which is coupled to an kneader input shaft, 9, of a reciprocating kneader, 8, by a kneader shaft couple, 7. The kneader shaft couple insures that the rotation and oscillation of the output coupler is translated to the kneader input shaft and will be described more fully herein. The reciprocating kneader comprises a screw, 10, with a multiplicity of flights, 11, thereon. As the screw rotates and oscillates the flights pass by pins, 12, in close proximity thereby providing the kneading function. Precursor material, 14, enters a hopper, 15, wherein it passes into the kneader and exits, optionally through an extrusion die, 16, as extrudate, 17, for collection in a bin, 18.

Figure 2:
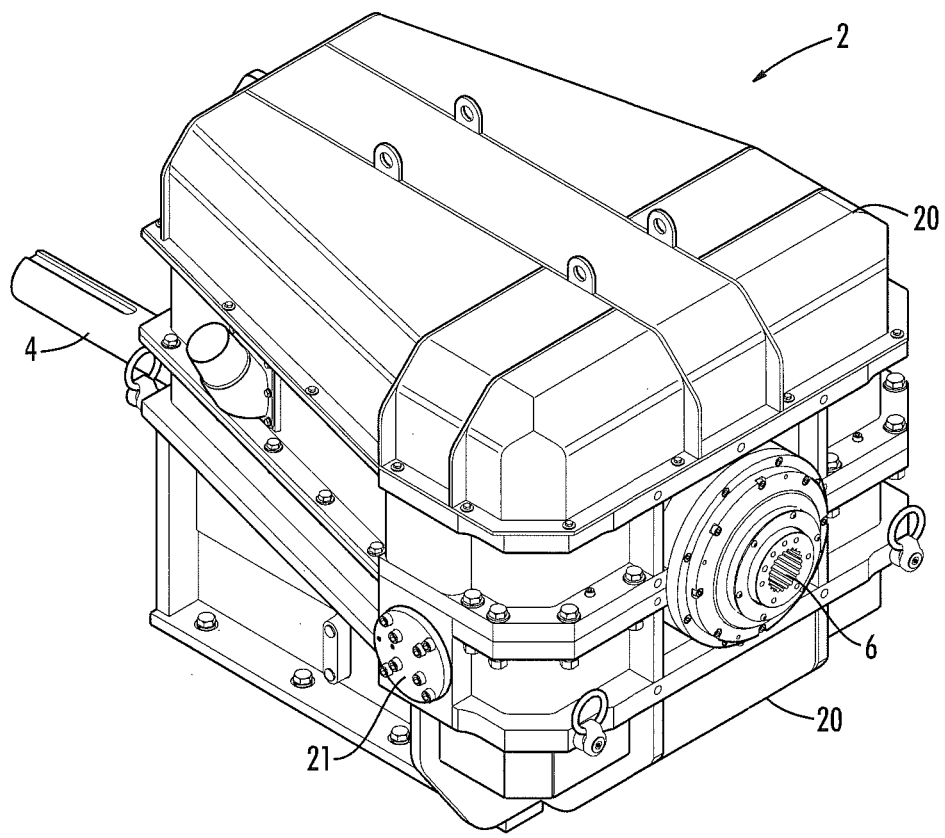
FIG. 2 is a schematic perspective view of an embodiment of the invention.

The gear box, 2, is shown in isolated perspective view in FIG. 2. In FIG. 2, the gear box comprises upper and lower casing members, 20, suitable for mounting to a frame member, not shown, as would be realized. The gear box primary shaft, 4, extends from the rear of the gear box and the output coupler, 6, is accessible on the front of the gear box for coupling thereto. Casing bearings are not further described since these would be readily understood to be appropriate and the design thereof is not particularly limiting.

A pivot pin flange, 21, is on either side of the casing the purpose of which will be more fully understood after further discussion.

Figure 3:
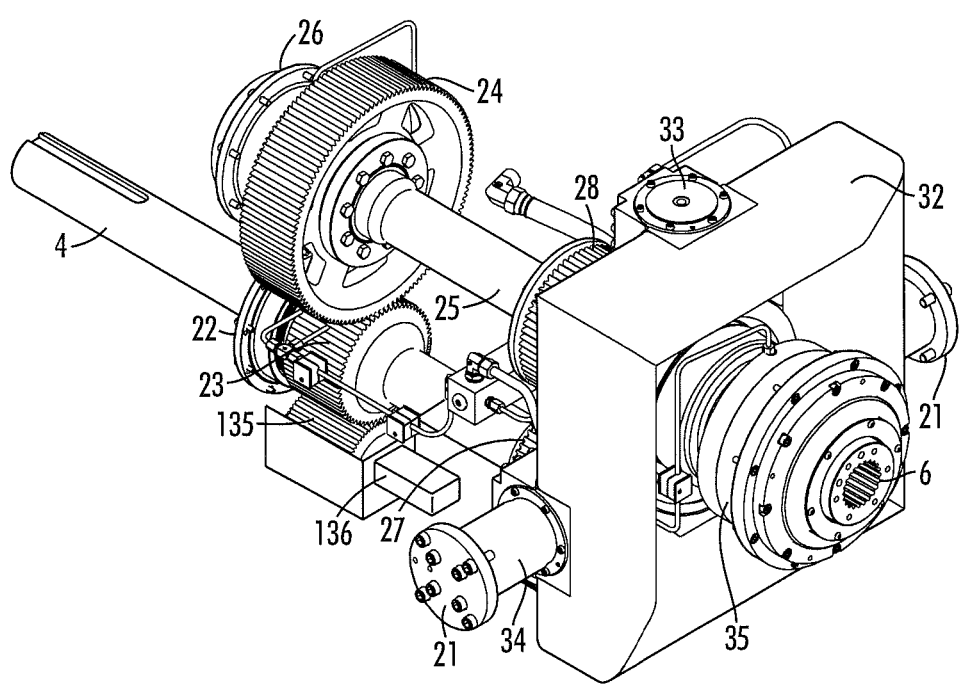
FIG. 3 is a schematic front perspective view of an embodiment of the invention.
Figure 4:
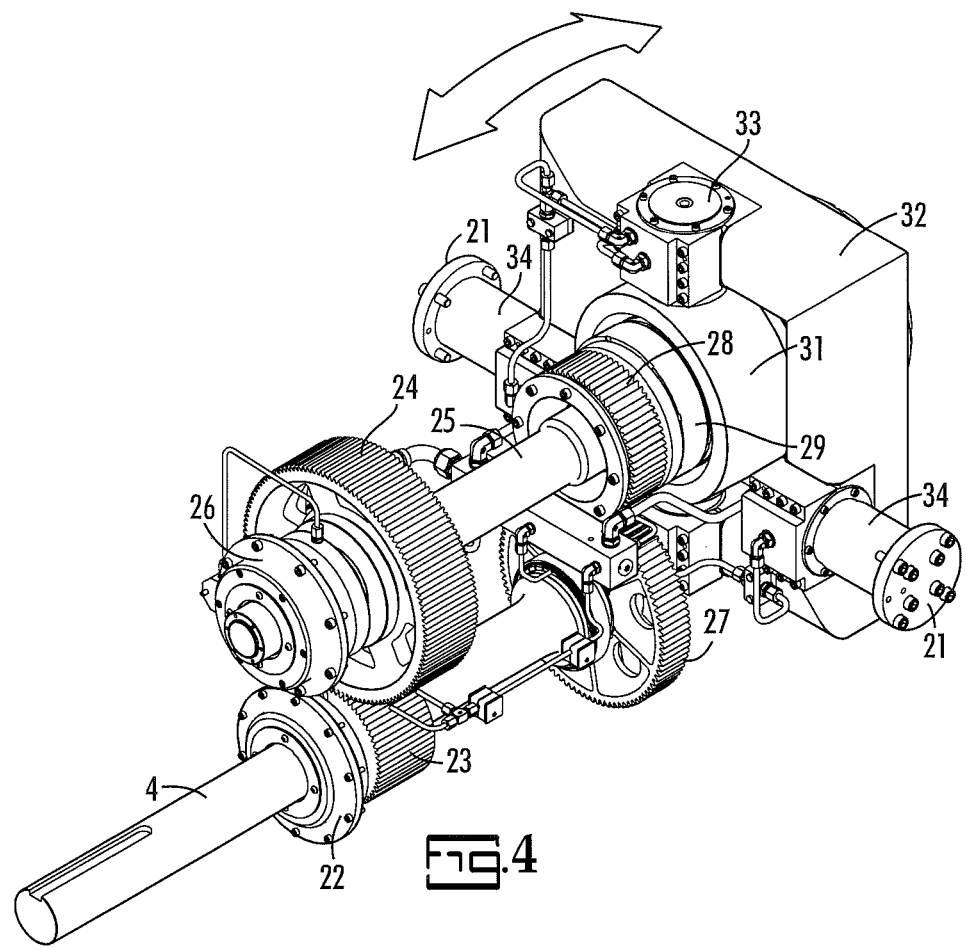
FIG. 4 is a schematic back perspective view of an embodiment of the invention.

An embodiment of the internal components of the gear box is illustrated in front perspective view in FIG. 3 and another embodiment is illustrated in rear perspective in FIG. 4 with the casing removed in both views for clarity.

The gear box primary shaft, 4, drives rotation and oscillation in concert. A bearing, 22, supports the gear box primary shaft in the housing as would be readily appreciated. A primary rotational gear, 23, is secured to, and driven by, the gear box primary shaft. The primary rotational gear engages with a secondary rotational gear, 24, thereby providing rotation to a gear box secondary shaft, 25. The gear box secondary shaft is preferably parallel to the gearbox primary shaft. The gear ratio of the primary rotational gear to the secondary rotational gear determines the rate of rotation of the gear box secondary shaft, 25, relative to the gear box primary shaft, 4. The gear box secondary shaft is supported by a bearing, 26, which engages with the casing.

A primary oscillation gear, 27, is secured to, and driven by, the gear box primary shaft. The primary oscillation gear engages with a secondary oscillation gear, 28, which rotates freely on the gear box secondary shaft, 25. The secondary oscillation gear drives an eccentric, 29. The eccentric will be described further herein.

Figure 5:
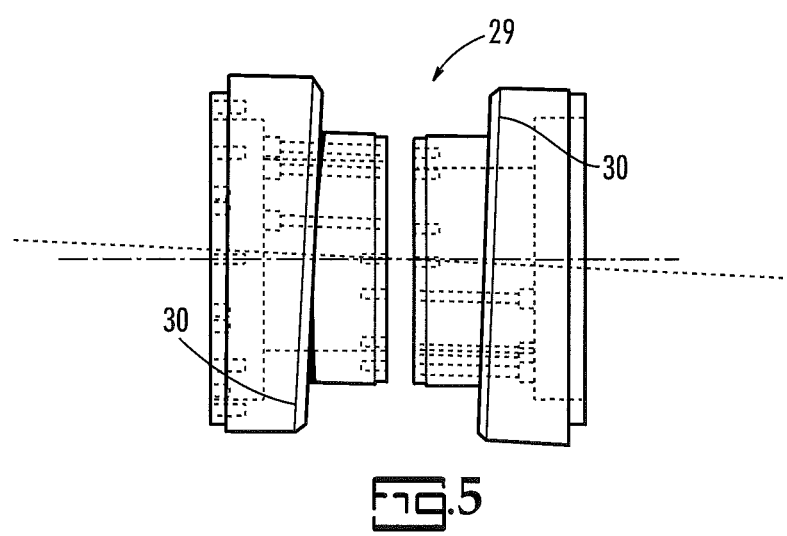
FIG. 5 is a schematic side view of an embodiment of the invention.

A fixed eccentric is illustrated in FIG. 5 wherein the fixed eccentric is illustrated in isolated view for clarity. In the fixed eccentric a yoke, 31, rides on the fixed eccentric. As the fixed eccentric rotates the yoke transfers the pattern of the lobe, 30, to a housing, 32. The yoke pivots on a secondary pivot axis, 33, within the housing and the housing pivots on a primary pivot sleeve, 34, which is secured to the casing by bearings (not shown) and bound by the pivot pin flange, 21. The primary pivot sleeve, 34, is offset relative to the gear box secondary shaft which causes the housing to oscillate back and forth along the arrow in FIG. 4 on the axis defined by the primary pivot sleeves. The length of the oscillation, defined at the axis of the gear box secondary shaft, is dependent on the angle of the lobes on the fixed eccentric and the distance between the primary pivot sleeve and the axis of the gear box secondary shaft. In general, the stroke length increases as the angle of the fixed eccentric increases and as the distance from the center line of the gear box secondary shaft to the primary pivot sleeve increases. A preferred output coupler bearing housing, 35, contains the output coupler, 6, and provides an attachment point for the kneader.

Figure 9A:
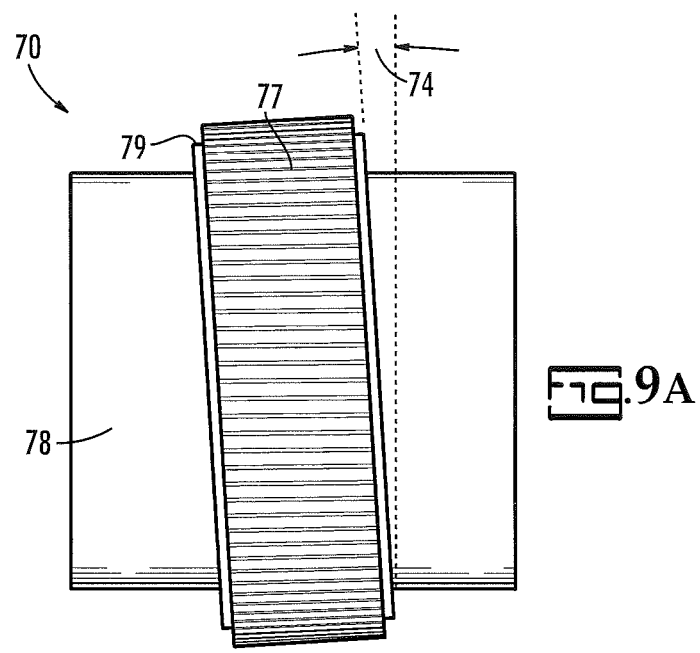
FIG. 9A is a side view of an inner eccentric.
Figure 9B:
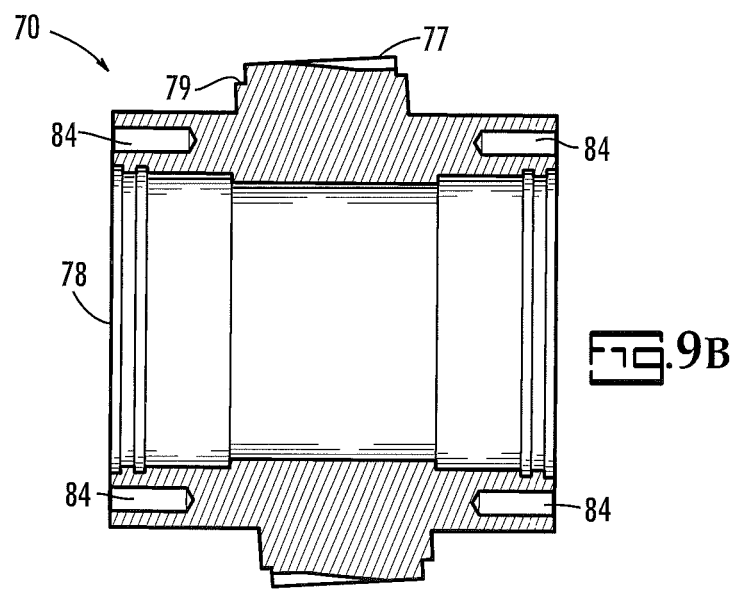
FIG. 9B is a cross-sectional schematic view of the inner eccentric of FIG. 9A.

An adjustable eccentric is illustrated in exploded view in FIG. 7 and side view in FIG. 8. The adjustable eccentric comprises a first eccentric illustrated as an inner eccentric, 70, which is encased between a second eccentric illustrated as an outer eccentric, 72, and a rear casing, 75. The first eccentric, which is illustrated in isolated side view in FIG. 9A and cross-sectional view in FIG. 9B, has a first eccentric angle, 74, created by the offset of a gear, 77, relative to circumference of the first eccentric sleeve, 78. The first eccentric sleeve receives the gear box secondary shaft, 25 of FIG. 4, and rotates freely thereon but is translationally coupled through the secondary shaft bearings or thrust bearings. The inner eccentric has a shoulder, 79, the purpose of which will be more fully detailed below.

Figure 10A:
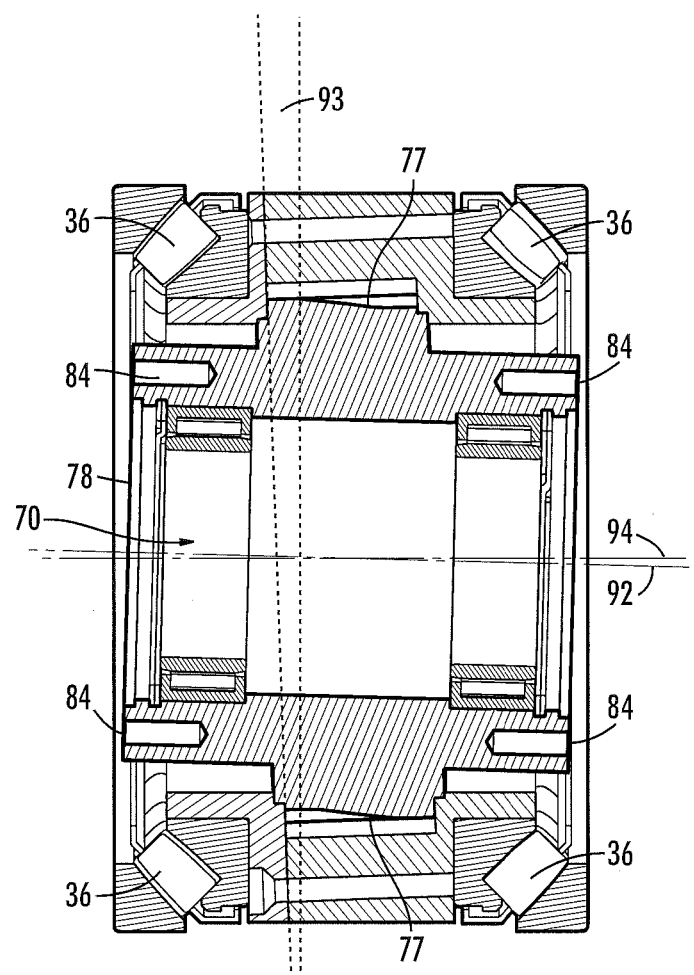

The adjustable eccentric is illustrated in cross-sectional view in FIGS. 10A and 10B. The first eccentric and second eccentric can be rotated relative to each other to change the angle of the mated first eccentric and second eccentric thereby adjusting the total angle of the adjustable eccentric. The outer eccentric engages the inner eccentric at the shoulder. During rotation the entire adjustable eccentric will rotate on the eccentric axis thereby causing the outer extent of the adjustable eccentric to persuade the secondary shaft to oscillate by engagement with the secondary shaft bearings, 36. As illustrated in FIG. 10A the inner eccentric is rotated relative to the outer eccentric such that the total eccentric angle, 92 is minimized. In FIG. 10B the inner eccentric is rotated relative to the outer eccentric such that the total eccentric angle, 92, is maximized.

As would be realized, the adjustable eccentric is rotationally coupled to the secondary oscillation gear, 28 of FIG. 4, such as by threaded member receiving voids, 84. As the secondary oscillation gear, 28 of FIG. 4, rotates the adjustable eccentric thereby causing the secondary shaft to oscillate in response to the eccentric motion of the adjustable eccentric.

A worm adjustment assembly, 86, allows the inner eccentric to be rotated relative to the outer eccentric thereby allowing the eccentric angle to be adjusted from a maximum to a minimum. The worm adjustment comprises a worm screw, 88, within a housing, 90. The housing is fixed relative to the outer eccentric. As the worm screw is rotated the worm gear engages the gear, 77, thereby causing the gear to rotate relative to the outer eccentric thereby adjusting the eccentric angle, 92, of the adjustable eccentric relative to the center line, 94, of the gear box secondary shaft, 25. The worm adjustment assembly preferably comprises bushings, 96, to stabilize the worm gear in the housing. An optional but preferred rotational locking mechanism, 98, inhibits the worm gear from rotating after being set at a predetermined position.

The adjustable eccentric is shown in cross-sectional view in FIGS. 10A and 10B wherein the extremes of the eccentric angle are demonstrated. In FIG. 10A the inner eccentric, 70, is rotated such that the first eccentric angle, 74 of FIG. 9, and second eccentric angle, 93, negate each other such that the eccentric angle, 92, is a minimum. If, as illustrated in FIG. 10A, the first eccentric angle and second eccentric angle are identical the eccentric angle could be zero. In FIG. 10B, the inner eccentric is rotated such that the first eccentric angle, 74 of FIG. 9, and second eccentric angle, 93, are additive eccentric angle, 92, is a maximum. It would be apparent that any eccentric angle from minimum to maximum can be achieved by rotating the worm gear which, in-turn, rotates the inner eccentric relative to the outer eccentric. By way of non-limiting example, if the first eccentric angle is 3° and the second eccentric angle is 1° the adjustable eccentric can have a range of eccentric angle of 2° to 4° and can be set to any angle there between.

As would be apparent from the description the secondary oscillation gear and eccentric may rotate at a different rate than the gear box secondary shaft. Therefore, they must rotate freely on the gear box secondary shaft. The adjustable eccentric and secondary shaft are coupled axially by secondary shaft bearings, 36.

A tertiary gear, 135, as illustrated in FIG. 3, may function as an idler roller or it may turn an oil pump, 136, or other auxiliary equipment, diagnostic equipment or the like. Auxiliary equipment and diagnostic equipment may include lubrication monitors, tachometers, hour monitors and the like.

Figure 6:
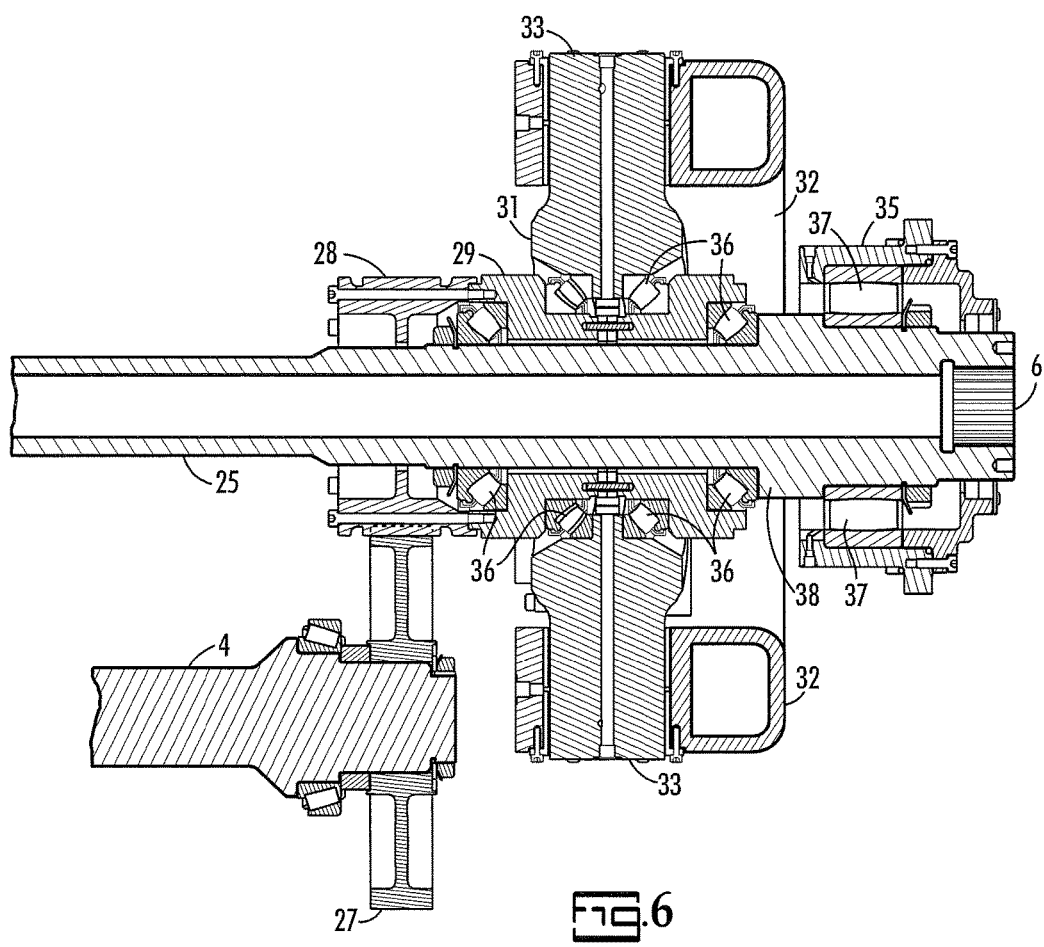
FIG. 6 is a schematic cross-sectional side view of an embodiment of the invention.

A portion of the internal components of the gear box is illustrated in cross-sectional side schematic view in FIG. 6. As illustrated in FIG. 6, the eccentric, 29, rotates freely on the gear box secondary shaft, 25. It is preferable that the eccentric and gear box secondary shaft have secondary shaft bearings, 36, there between to reduce rotational friction between the shaft and a land, 38, of the gear box secondary shaft. The secondary shaft bearings are preferably spherical roller thrust bearings.

It is preferable that the output coupler, 6, and output coupler bearing housing, 35, have a coupler housing bearing, 37, there between to reduce rotational friction. A particularly preferred coupler housing bearing is a toroidal bearing.

Toroidal bearings have a single row of bearings with long, slightly crowned symmetrical rollers. The raceways of both the inner and outer rings are concave and situated symmetrically about the bearing center. Toroidal bearings are particularly preferred due to their self-aligning and axial displacement properties. Toroidal bearings are available as CARB® toroidal roller bearings from SKF Corporation.

A feature of the present invention is the constant correlation of rotation and oscillation thereby prohibiting catastrophic contact between flights and pins. As would be realized the primary rotational gear and primary oscillation gear are secured to the gear box primary shaft in such a way that they do not rotate on the gear box primary shaft independent of each other. The primary rotational gear and primary oscillation gear are preferably reversibly attached to the gear box primary shaft by keyways, mating surface shapes, threaded members and the like. Likewise, the union between the primary rotation gear and secondary rotation gear, the union between the primary oscillation gear and secondary oscillation gear, the union between the secondary rotation gear and the gear box secondary shaft and the union between the secondary oscillation gear and eccentric are preferably unions which prohibit slip.

A particular feature of the invention is the ability to change the stroke. The stroke length can be changed by adjusting the eccentric. The stroke ratio can be changed by changing the gear ratio of the primary oscillation gear to secondary oscillation gear, by changing the gear ratio of the primary rotation gear to secondary rotational gear or combinations thereof.

By way of example, with reference to FIG. 4, the rotation rate of the gear box primary shaft, 4, is determined by the motor attached thereto. For the purposes of illustration a rotation rate of the gear box primary shaft of 1800 rpm is considered. The rotation rate of the screw within the kneader will be the same as the rotation rate of the gear box secondary which is determined by the gear ratio of the primary rotation gear to the secondary rotation gear. For example, a gear ratio of the secondary rotational gear to the primary rotational gear could be 2:1 thereby providing a rotation rate for the gear box secondary shaft which is half of the rotation rate of the gear box primary shaft. In the illustrative example the rotation rate of the kneader screw would be 900 rpm.

The oscillation rate of the screw would be determined by the number of lobes on the eccentric and the rotation rate of the eccentric. For illustration purposes, the eccentric may have a single lobe wherein one rotation of the eccentric creates one oscillation of the screw. The oscillation rate would therefore be determined by the rotation rate of the eccentric. The eccentric is coupled to the gear box primary shaft and defined by the ratio of the primary oscillation gear to the secondary oscillation gear. Again for illustration purposes, if the ratio of the primary oscillation gear to the secondary oscillation gear is 1.5:1 the eccentric rotates at a rate of 2700 rpm which is three times that of the gear box secondary shaft. The result in this example is 3 oscillations per rotation for a stroke ratio of 3.

A particular feature of the invention is that the stroke ratio is invariant to motor speed or the rotational rate of the gear box primary shaft thereby eliminating collision opportunities within the kneader. Any disturbance in speed of the motor, such as by power supply fluctuations, would result in a change in the rotation rate of the kneader screw and rate of oscillations but there would be no alteration in the stroke ratio.

One of skill in the art could determine, or define, a stroke ratio using common engineering principles based on the teachings herein. Additional components and features may be added in accordance with standard engineering practice. Counterbalances, for example, may be included as appropriate.

In terms of process, it is seen that the drive motor, 1, provides a primary source of rotation while the secondary rotational gear determines the amount of oscillation per rotation through interaction with eccentric 29. This arrangement provides rotation to the screw, 10, as well as oscillation. The stroke ratio remains constant and is independent of the rate of rotation of the primary source of rotation. The process of this invention is unique in that it maximizes the kneading effect due to the interaction between the screw flights and associated pins, 12. The kneading apparatus is operated in a horizontal mode so as to minimize gravitational influences on the materials being subjected to the process of this invention.

In terms of material being subjected to the process of this invention, the material is acted upon by a rotating screw having a multiplicity of flights, 11, intermeshed with stationary pins, 12, which extend from a cylindrical housing. The screw moves raw material such that the flights intermesh with the pins to knead the raw material.

Simultaneously the screw is reciprocated such that the flights pass between pins both rotationally and translationally in a direction parallel to the axis of the screw.

The rotation and oscillation are correlated so as to prohibit contact between the flights in the pins.

While prior art kneading apparatuses have provided kneading machines which both oscillate and translate at a rate of one oscillation per rotation, the process of this invention can be carried out with a rate of two oscillations per rotation and greater.

It has been found that a ratio of oscillations per rotation of greater than 2.5 and up to 3 provides a kneading effect surprisingly superior to the prior art having only one oscillation per rotation. That is to say the effect of a ratio of oscillations per rotation of 3 has a far greater kneading effect than 3 times the kneading effect of an oscillation rate per rotation of 1.

The invention has been described with reference to the preferred embodiments without limit thereto. One of skill in the art would realize additional embodiments and alterations which are not specifically set forth herein but which are within the metes and bounds of the invention as more specifically set forth in the claims appended hereto.

The invention claimed is:

1. A process for operating a reciprocating kneader which has a screw shaft which both rotates and oscillates comprising:
   providing a primary source of rotation;
   providing a secondary source of rotation driven by said primary source of rotation;
   providing rotational motion from said secondary source of rotation so as to provide oscillation to said screw;
   rotating said screw from said primary source of rotation;
   whereby said screw rotates and oscillates from said primary source of rotation and wherein the rate of oscillation per rotation does not vary with the rate of rotation from said primary source of rotation.

2. The process according to claim 1 wherein said oscillation is provided by an eccentric driven by said secondary source of rotation.

* * * * *